US012649160B2

(12) United States Patent
Yamada

(10) Patent No.: US 12,649,160 B2
(45) Date of Patent: Jun. 9, 2026

(54) ELECTROSTATIC COATING PLANT

(71) Applicant: ABB SCHWEIZ AG, Baden (CH)

(72) Inventor: Yukio Yamada, Tokyo (JP)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/364,719

(22) Filed: Aug. 3, 2023

(65) Prior Publication Data

US 2024/0100548 A1 Mar. 28, 2024

(30) Foreign Application Priority Data

Sep. 26, 2022 (JP) ................................ 2022-152338

(51) Int. Cl.
*B05B 5/16* (2006.01)
*B05B 5/08* (2006.01)

(52) U.S. Cl.
CPC ............ *B05B 5/1616* (2013.01); *B05B 5/082* (2013.01)

(58) Field of Classification Search
None
See application file for complete search history.

(56) References Cited

U.S. PATENT DOCUMENTS

2015/0328648 A1* 11/2015 Umeki .................. G01R 31/52 118/712
2015/0360246 A1 12/2015 Iwase
2016/0199859 A1 7/2016 Yamasaki et al.
2017/0348904 A1* 12/2017 Chang .................. B29C 64/393
2024/0100548 A1 3/2024 Yamada

FOREIGN PATENT DOCUMENTS

JP H10156223 A 6/1998
JP 2003071330 A 3/2003
JP 2005058998 A 3/2005
JP 4388059 B2 12/2009
JP 2010022933 A 2/2010
JP 2014079704 A 5/2014
JP 5753146 B2 7/2015
JP 2017035653 A 2/2017
JP 7208437 B1 1/2023
WO 2012042340 A1 4/2012

* cited by examiner

*Primary Examiner* — Shamim Ahmed
*Assistant Examiner* — Bradford M Gates
(74) *Attorney, Agent, or Firm* — Greenberg Traurig, LLP

(57) ABSTRACT

The electrostatic coating plant includes an abnormality detection unit that detects abnormalities of a bumper. The detection of the abnormalities can be based on the difference between the level of the high voltage outputted from a high voltage generator, and the voltage level obtained when the electrostatic coating machine, which is not spraying coating material, is placed at a measurement position opposite to and separated by a predetermined separation distance from multiple measurement points on the bumper, arranged at the coating position, and lines of electric force are formed to the bumper with a constant current level.

9 Claims, 7 Drawing Sheets

[FIG. 1]
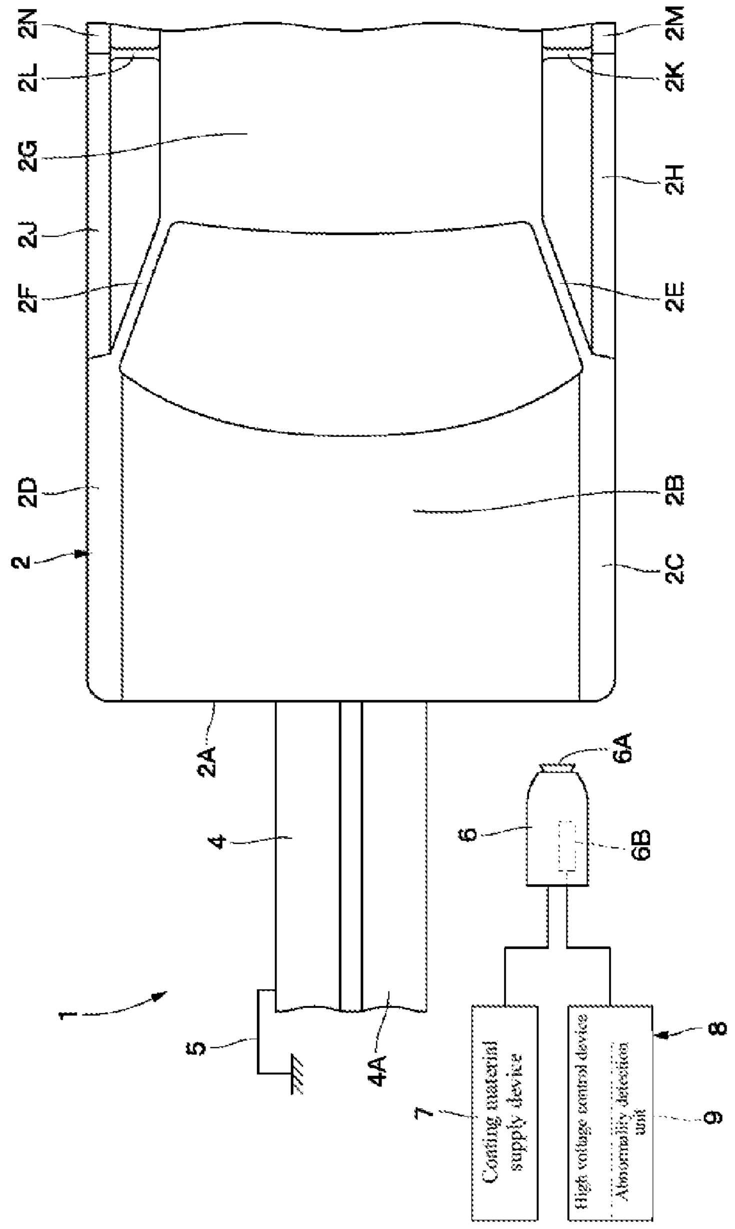

[FIG. 2]
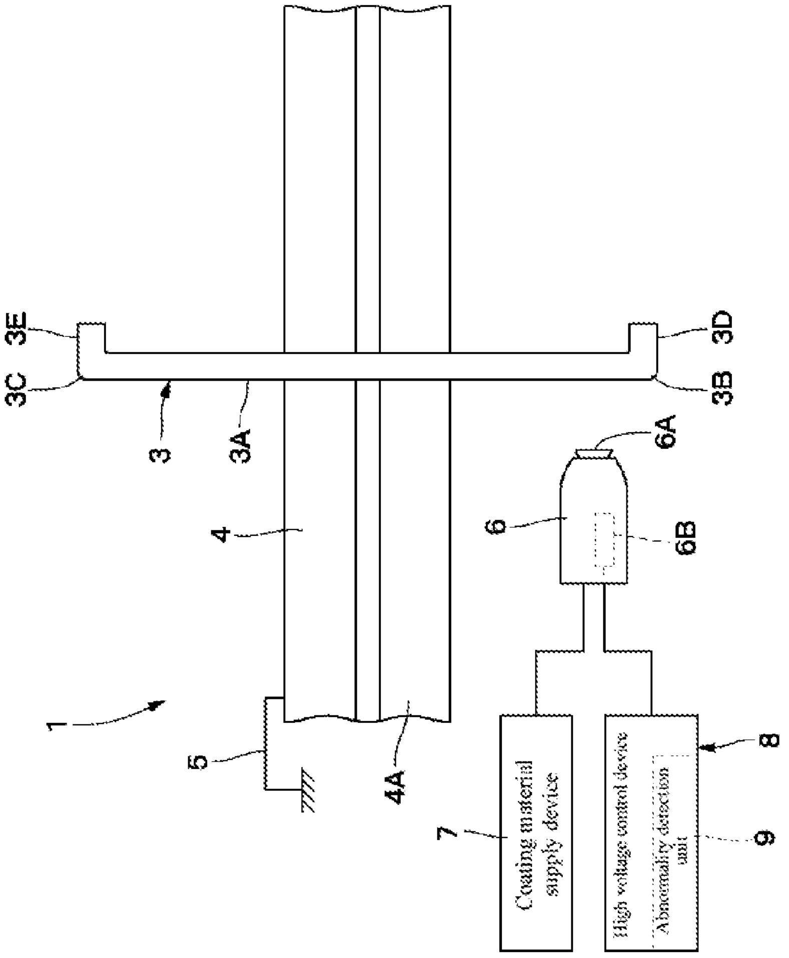

[FIG. 3]
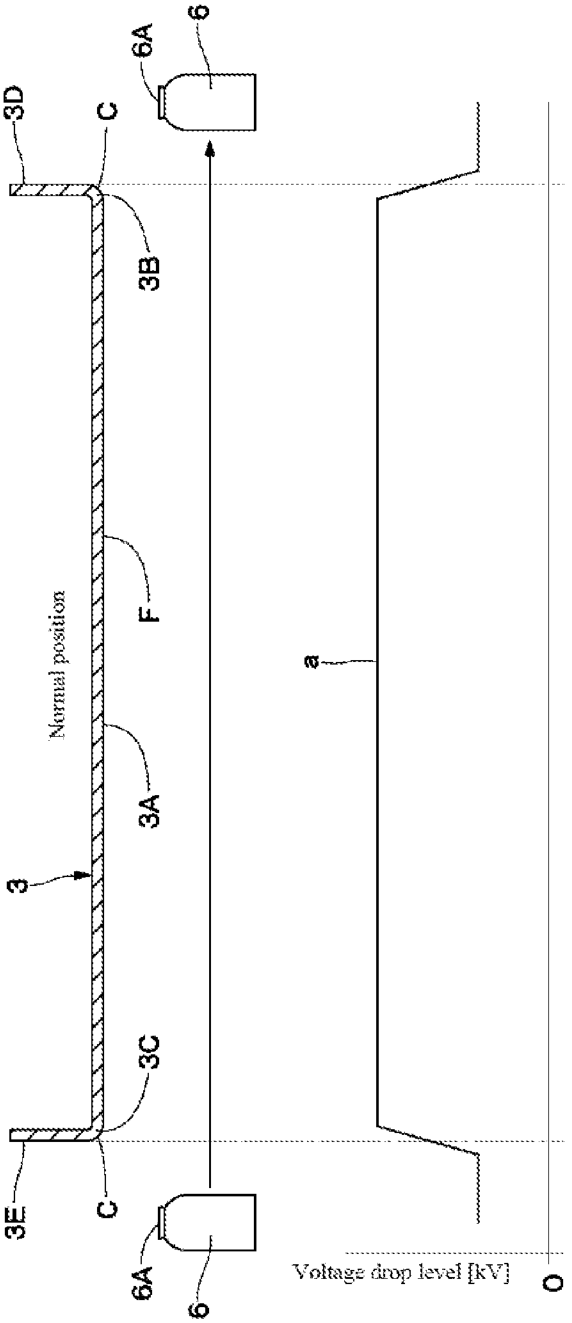

[FIG. 4]
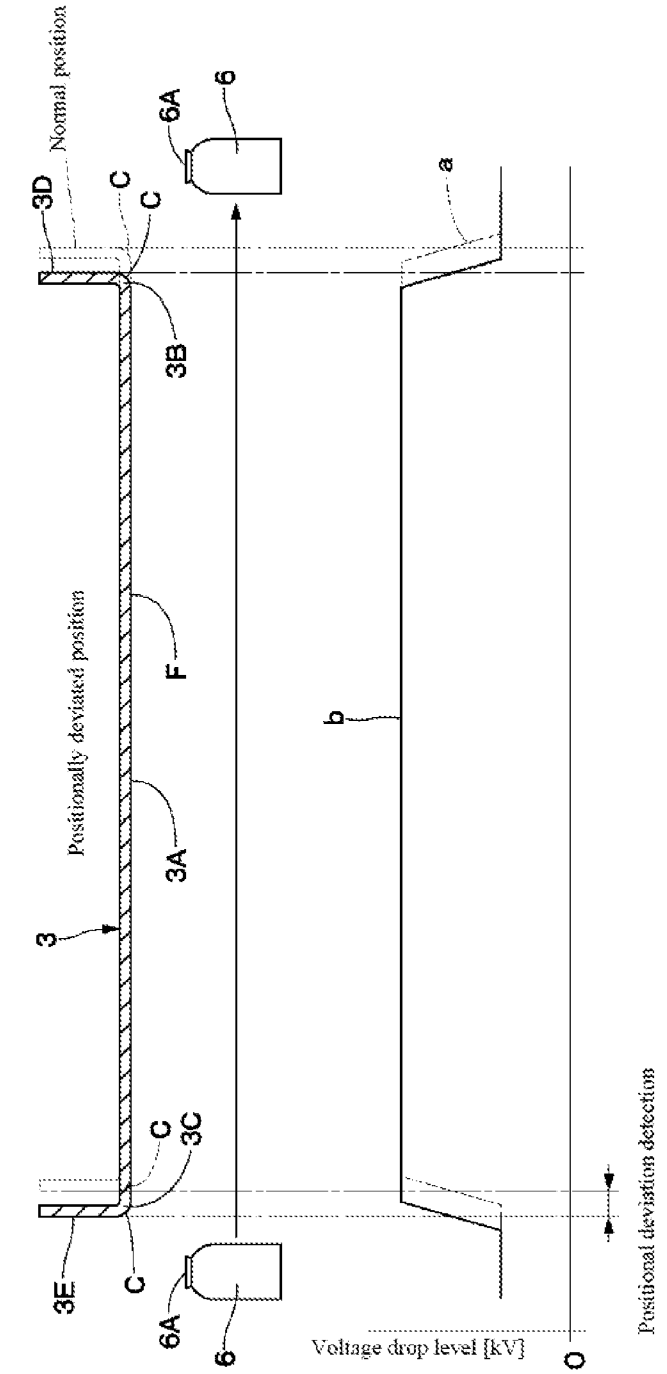

[FIG. 5]
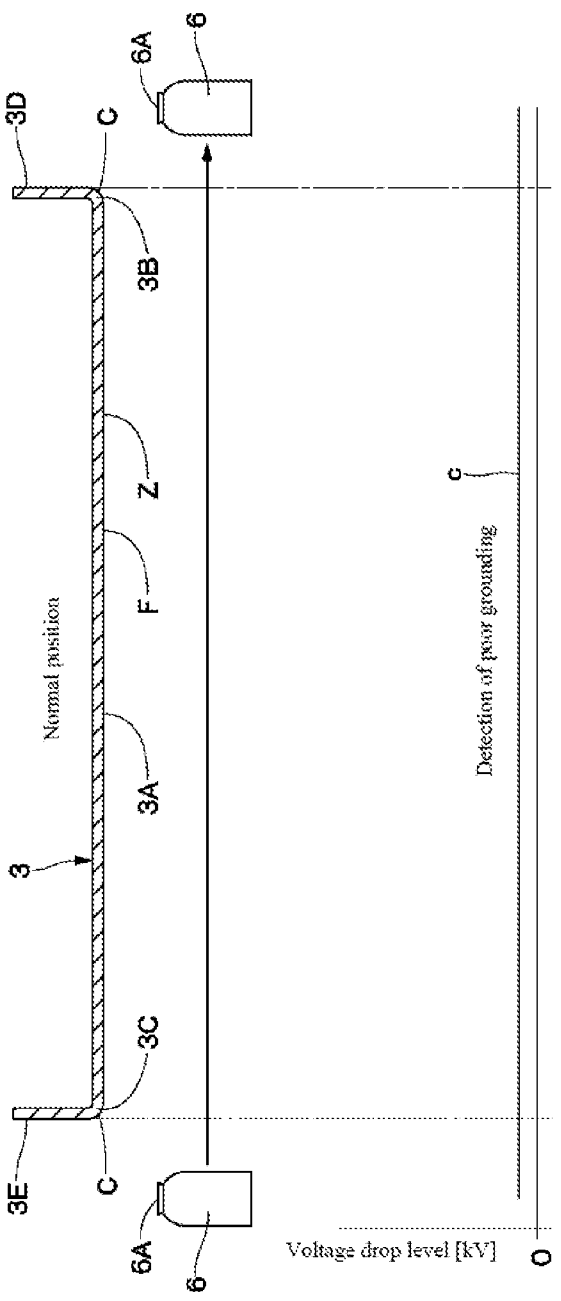

[FIG. 6]
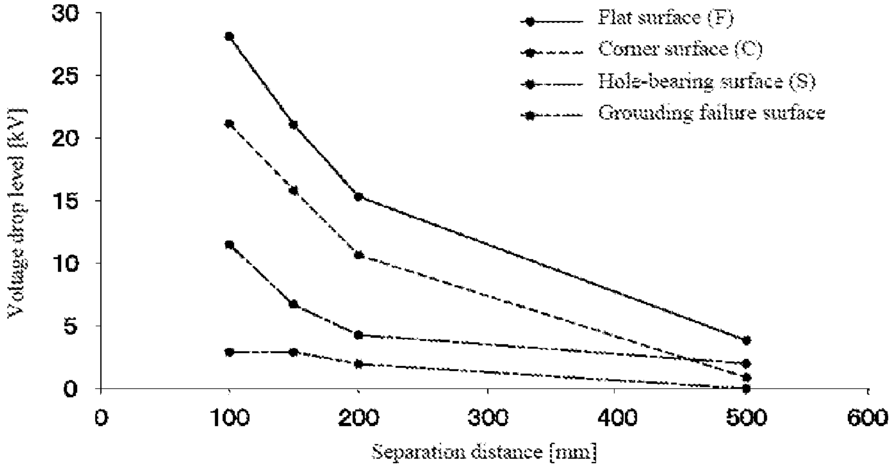

[FIG. 7]
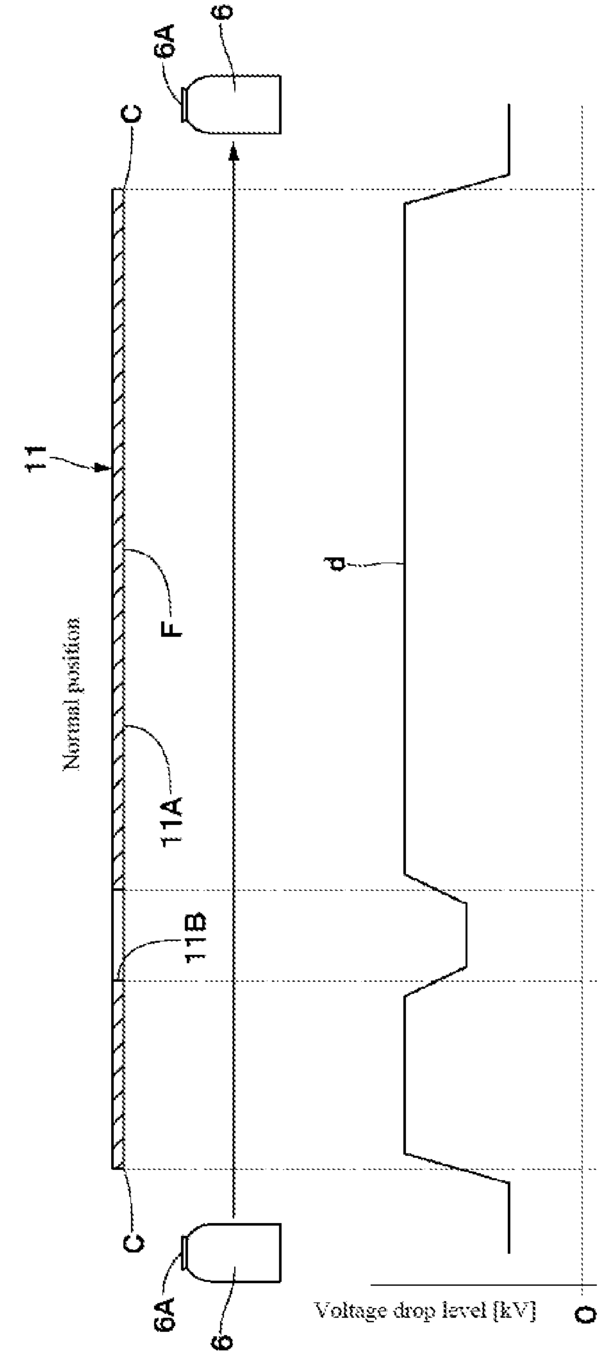

ELECTROSTATIC COATING PLANT

CROSS-REFERENCE TO RELATED APPLICATIONS

This is a non-provisional application claiming priority to Japanese patent application Serial No.: 2022-0152338, filed on Sep. 26, 2022; which is herein incorporated by reference in its entirety.

TECHNICAL FIELD

This disclosure relates to an electrostatic coating plant that is suitable for use, for example, for coating objects to be coated, such as automobile bodies and bumpers, by applying a high voltage to the coating material.

BACKGROUND ART

Generally, an electrostatic coating plant for coating objects to be coated, such as automobile bodies and bumpers, comprises a support means for supporting the object to be coated at a coating position, a grounding means connected to the object to be coated in order to ground the object to be coated, and an electrostatic coating machine which has a high voltage generator that outputs a high voltage for forming lines of electric force to the object to be coated, which has been grounded by the grounding means, and for applying the voltage to the coating material, which coating machine coats the object to be coated, which has been arranged at the coating position, by causing the coating material, which has been electrostatically charged to a high voltage, to fly along the lines of electric force.

In the electrostatic coating plant for coating objects to be coated, a stand or jig is placed on a running conveyor, and the object to be coated is placed on the stand or jig and transported to the necessary location for coating. The object to be coated is supported at the coating position by the stand placed on the conveyor in a grounded state created by the grounding means, and at this coating position, the object to be coated is coated by the electrostatic coating machine (patent document 1).

Here, in order to apply a high-quality coating to a surface to be coated of the object to be coated, it is necessary to position the electrostatic coating machine at a correct separation distance from the surface to be coated of the object to be coated. However, there is a possibility that the placement position of the stand relative to the conveyor may be deviated, the mounting position of the object to be coated relative to the stand may be deviated, or the position of the coating robot or the electrostatic coating machine relative to the conveyor may be deviated. In such a case, it may not be possible to achieve the correct separation distance, or it may not be possible to correctly arrange the object to be coated in the direction from which the coating material is sprayed, resulting in a decrease in coating quality.

To address this, in recent electrostatic coating plants, the positional deviation of the object to be coated relative to the conveyor and the positional deviation of the coating robot, etc. are monitored, positional deviation is detected before the coating operation, and measures are taken to prevents coating defects. This positional deviation monitoring can be performed using image processing with a camera, position measurement with a photoelectric tube, etc.

Moreover, when performing electrostatic coating, it is necessary to ground the object to be coated in order to form lines of electric force between it and the electrostatic coating machine. However, if coating material that has adhered to the stand or jig (hanger, etc.) dries and builds up, the grounding of the object to be coated may become insufficient, in which case, appropriate lines of electric force may not be formed to the surface to be coated, leading to a decrease in coating quality and coating efficiency.

In addition, parts such as doors and hoods, which are coated along with the main body of the automobile, are temporarily mounted to the automobile main body by means of jigs designed to allow opening and closing of these parts. This jig-based mounting structure, to make operations easier, generally employs structures that provide support through spring force and frictional force, such as clips. However, jigs that are repeatedly used need maintenance to remove the coating material in order to ensure grounding and maintain the shape of the jig, as coating material that comes off the object to be coated adheres to the jigs as coating material residue. During this maintenance, there is a possibility that contact/conduction faults due to accumulation of coating material or deformation of the jigs may develop, or that misalignment of the mounting position may occur.

Furthermore, the objects to be coated may include parts made of insulating resin materials (resin parts), such as automobile bumpers. To apply electrostatic coating to these resin parts, a conductive primer, etc. is applied to the surface of the resin part to form a conductive film, and the grounded conveyor and the conductive film are connected via the stand or jig. This allows the resin part to be grounded. However, if the grounding of the conveyor is insufficient, or if the contact between the conveyor and the conductive film is insufficient, appropriate lines of electric force may not be formed to the surface to be coated, leading to a potential decrease in coating quality.

To address this, in patent document 1, when inspecting the state of grounding of the object to be coated, a coating gun to which a high voltage has been applied from a voltage application device is positioned at a distance from the object to be coated in a state where coating material is not being sprayed onto the object to be coated, and the current flowing through the coating gun is measured with a current measuring device. In this way, patent document 1 inspects the state of grounding of the object to be coated based on current measured with a current measuring device.

PRIOR ART DOCUMENTS

Patent Documents

[Patent document 1] Japanese Patent No. 5753146

SUMMARY OF THE INVENTION

Problem to be Solved by the Invention

However, there is the problem that the equipment used for monitoring of positional deviation of objects to be coated, coating robots, etc., including camera-based image processing, position measurement using photoelectric tubes, etc., requires an explosion-proof structure and is expensive and incurs additional maintenance costs.

In addition, inspecting the state of grounding of the object to be coated involves an operation of moving the coating gun close to the object to be coated. Therefore, if positional deviation has occurred in the object to be coated or the coating robot, etc., the coating gun may come abnormally close to the object to be coated, such that the impedance to ground becomes smaller than expected. In such cases, there is a risk of inducing an electron avalanche, where the current flows all at once, and this poses the problem of making it impossible to perform accurate inspection.

The present invention was made in light of the problems of the prior art described above, and the purpose of the present invention consists in providing an electrostatic coating plant that makes it possible to easily detect positional deviation of the object to be coated, etc., and to inspect the state of grounding of the object to be coated, thus allowing the coating quality to be improved.

Means for Solving the Problem

One embodiment of the present invention is an electrostatic coating plant comprising a support means for supporting the object to be coated at a coating position, a grounding means connected to the object to be coated in order to ground the object to be coated, and an electrostatic coating machine which has a high voltage generator that outputs a high voltage for forming lines of electric force to the object to be coated, which has been grounded by the grounding means, and for applying the voltage to the coating material, which coating machine coats the object to be coated, which has been arranged at the coating position, by causing the coating material, which has been electrostatically charged to a high voltage, to fly along the lines of electric force, where the electrostatic coating plant further comprises an abnormality detection unit which detects abnormalities of the object to be coated based on the difference between the level of the high voltage outputted from the high voltage generator and the voltage level obtained when the electrostatic coating machine, which is not spraying coating material, is placed at a measurement position opposite to and separated by a predetermined separation distance from one or multiple measurement points on the objects to be coated, arranged at the coating position, and lines of electric force are formed to the objects to be coated with a constant current level.

Effect of the Invention

According to one embodiment of the present invention, positional deviation of the object to be coated, etc. can be easily detected and the state of grounding of the object to be coated can be easily inspected, thus making it possible to maintain the correct distance between the object to be coated and the electrostatic coating machine, and to improve the coating quality. Furthermore, during electrostatic coating, high-voltage abnormalities can be prevented and incomplete coating can be avoided.

BRIEF DESCRIPTION OF THE DRAWINGS

FIG. 1 is an overall configuration diagram for a case where an automobile body is to be coated by means of an electrostatic coating plant according to a first embodiment of the present invention.

FIG. 2 is an overall configuration diagram for a case where an automobile bumper is to be coated by means of an electrostatic coating plant according to the first embodiment of the present invention.

FIG. 3 is an inspection schematic diagram showing a detection structure for positional deviation and poor grounding of a bumper.

FIG. 4 is an inspection schematic diagram showing a detection structure for positional deviation of a bumper.

FIG. 5 is an inspection schematic diagram showing a detection structure for poor grounding of a bumper.

FIG. 6 is a characteristic graph showing the relationship between separation distance and voltage drop.

FIG. 7 is an inspection schematic diagram showing a detection structure for bumper positional deviation and poor grounding using a hole according to a second embodiment of the present invention.

MODES FOR CARRYING OUT THE INVENTION

An electrostatic coating plant according to an embodiment of the present invention will be described in detail below in accordance with the attached drawings.

FIG. 1 through FIG. 6 illustrate the electrostatic coating plant and examples of inspection according to a first embodiment of the present invention. The present embodiment will be described by presenting an example in which an automobile body or bumper, as the object to be coated, is arranged at the coating position by means of a conveyor severing as a support means, and is coated with a rotary atomizer head type electrostatic coating machine.

In FIGS. 1 and 2, the electrostatic coating plant 1 performs coating of the object to be coated, such as an automobile body 2, bumper 3, etc. The electrostatic coating plant 1 comprises a conveyor 4, a grounding means 5, an electrostatic coating machine 6, and an abnormality detection unit 9, which will be described later.

First, as examples of objects to be coated, there is the automobile body 2 shown in FIG. 1 and the automobile bumper 3 shown in FIG. 2. The body 2 comprises a structure elongated in the front-back direction, which is the conveyance direction of the conveyor 4. The body 2 is formed by joining press-molded thin metal sheets by welding. Furthermore, some parts are attached using hinges and bolts (not illustrated) so as to be rotatable or removable.

The configuration of the body 2 will be described. Note that the front-back direction and left-right direction of the body 2 are directions as seen from the perspective of a driver sitting in the automobile. The body 2 comprises a front panel 2A, engine hood 2B, left front fender 2C, right front fender 2D, left front pillar 2E, right front pillar 2F, roof 2G, left front door 2H, right front door 2J, left center pillar 2K, right center pillar 2L, left rear door 2M, right rear door 2N, left rear pillar, right rear pillar, trunk lid, left rear fender, right rear fender, rear panel, etc. (not illustrated).

Furthermore, the automobile bumper 3 has a shape that matches the design of the body 2. However, in the present embodiment, in order to clarify the detection process, the bumper is illustrated as being formed as a structure elongated in the left-right direction, perpendicular to the front-back direction which is the conveyance direction of the conveyor 4. The bumper 3 is formed of insulative resin material. Further, the bumper 3 comprises a front surface part 3A elongated in the left-right direction, a left corner part 3B at the left end of the front surface part 3A, a right corner part 3C at the right end of the front surface part 3A, a left side surface part 3D extending backward from the left corner part 3B, and a right side surface part 3E extending backward from the right corner part 3C. In addition, the bumper 3 made of resin material has a conductive film formed on its surface, for example, by coating with a conductive primer. This bumper 3, with a conductive film formed on its surface, can undergo electrostatic coating.

Here, in the present embodiment, the case will be described where coating by means of the electrostatic coating plant 1 is performed on the automobile bumper 3 as an example of an object to be coated. Namely, the abnormality detection unit 9 of the electrostatic coating plant 1 determines whether or not the bumper 3 has been correctly arranged at the coating position, and whether or not the bumper 3 has been properly grounded.

The bumper 3 is supported at the coating position shown in FIG. 2 by means of a stand placed on the conveyor 4. This coating position is an example of a position for coating an object to be coated, and would be modified depending on the shape of the object to be coated, the coating conditions, etc. For instance, an arrangement can be employed wherein the bumper is supported at the coating position in an orientation extending in the conveyance direction on a stand on the conveyor, or wherein the bumper is supported at the coating position in a state suspended vertically downward from a hanger or other jig.

The bumper 3 is arranged so as to extend in the left-right direction with the front surface part 3A facing forward in the conveyance direction of the conveyor 4. Here, the abnormalities that may occur during coating of the bumper 3 will be discussed. First, there is positional deviation between the bumper 3 and the electrostatic coating machine 6. This positional deviation includes positional deviation of the bumper 3 relative to the conveyor 4, and positional deviation of the electrostatic coating machine 6 relative to the bumper 3 at the coating position. In the present embodiment, the case where the positional deviation of the bumper 3 relative to the conveyor 4 is detected by the abnormality detection unit 9, and the case where poor grounding of the bumper 3 is detected by the abnormality detection unit 9 will be described.

The conveyor 4, as a support means, conveys the bumper 3 and supports it at the coating position (the position shown in FIG. 2). The conveyor 4 is provided with a stand (not illustrated) that moves along a rail 4A, and supports the bumper 3 on this stand.

The grounding means 5 is connected to the bumper 3 in order to ground (earth) the bumper 3. As an example of a grounding structure, the grounding means 5 connects a grounded earth wire to the conveyor 4, and links the stand and the bumper 3 using a clip (not illustrated). As a result, the grounding means 5 grounds the bumper 3 through the stand and the rail 4A of the conveyor 4.

The electrostatic coating machine 6 forms lines of electric force between itself and the bumper 3 grounded by the grounding means 5, and coats the bumper 3 arranged at the coating position by causing coating material, electrostatically charged to a high voltage, to fly along the lines of electric force. The electrostatic coating machine 6 is mounted to the distal end of an arm (not illustrated) of a coating robot. For example, the electrostatic coating machine 6 is configured as a rotary atomizer head type coating machine equipped, on the distal end side, with a rotary atomizer head 6A that rotates at high speed. The electrostatic coating machine 6 is provided with a high voltage generator 6B, comprising a Cockcroft circuit, etc., for applying a high voltage to the coating material to be sprayed from the rotary atomizer head 6A. In addition to a rotary atomizer head type coating machine, other electrostatic coating machines such as hydraulic atomizer type coating machines and air atomizer type coating machines can also be used.

Moreover, the electrostatic coating machine 6 is connected to a coating material supply device 7 and a high voltage control device 8. The coating material supply device 7, also known as a color change valve device, selectively supplies multiple types of coating materials and cleaning fluids (cleaning liquid, cleaning air) to the electrostatic coating machine 6.

Furthermore, the high voltage control device 8 is connected to the high voltage generator 6B of the electrostatic coating machine 6. The high voltage control device 8 performs control such that an appropriate high voltage is supplied to the rotary atomizer head 6A, etc. from the high voltage generator 6B. For example, the high voltage control device 8 adjusts the high voltage supplied to the rotary atomizer head 6A, etc. from the high voltage generator 6B to between −60 and −120 kV by controlling the voltage and current supplied to the high voltage generator 6B. Also, the high voltage control device 8 has an abnormality detection unit 9, described below.

Next, the function of the abnormality detection unit 9, which is the distinguishing portion of the present embodiment, and the procedure of inspection for positional deviation and poor grounding of the bumper 3 will be described in detail.

The abnormality detection unit 9 detects abnormalities of the bumper 3. Specifically, the abnormality detection unit 9 detects abnormalities such as the positional deviation between the bumper 3 and the electrostatic coating machine 6 (the positional deviation of the bumper 3 with respect to the conveyor 4, the positional deviation of the coating robot or the electrostatic coating machine 6 with respect to the bumper 3), and poor grounding of the bumper 3 by the grounding means 5 (including the defects in forming of the conductive film on the bumper 3).

Multiple measurement points on the bumper 3, arranged at the coating position by the conveyor 4, for example, flat surface F, which is a portion of the front surface part 3A away from the edge thereof, left corner part 3B of the front surface part 3A, corner surface C corresponding to the right corner part 3C, and hole-bearing surface S, which is the hole portion provided in the front surface part 3A, are defined for the abnormality detection unit 9. Furthermore, the flat surface F, corner surface C, and hole-bearing surface S may constitute a grounding failure surface Z due to poor connection of the grounding means 5, defective formation of the conductive film, and so on.

Here, the characteristics of the flat surface F, corner surface C, hole-bearing surface S, and grounding failure surface Z will be described using the characteristic graph of FIG. 6. The characteristic diagram of FIG. 6 shows the change in voltage level when the rotary atomizer head 6A of the electrostatic coating machine 6 is arranged at a predetermined separation distance from the surface to be coated of the bumper 3, while maintaining the absolute value of the high voltage outputted from the high voltage generator 6B at 60 kV or less, and maintaining the outflowing current at a pre-set level. In this case, the high voltage control device 8 keeps the current level constant at 30 μA.

As a result, on the flat surface F, the voltage drops to about 28 kV when the separation distance from the rotary atomizer head 6A of the electrostatic coating machine 6 is 100 mm. Furthermore, under the same conditions, on the corner surface C, the voltage drop is limited to about 22 kV. Furthermore, under the same conditions, on the hole-bearing surface S, the voltage drop is about 12 kV. Moreover, under the same conditions, on the grounding failure surface Z, the voltage drop is 3 kV or less. These voltage drop levels tend to vary more when the separation distance is shorter, making it easier and more accurate to identify locations where the shape or conditions change.

By employing a means of detecting voltage drop while keeping the current level constant in this manner, the generation of sparks due to voltage drop in relation to the opposed object (bumper 3) can be suppressed and the shape and state of the bumper 3 can be confirmed and discriminated while ensuring safety, to a greater extent than in cases where current changes are detected at a constant high voltage, even when the separation distance becomes too short due to deviation of the relative position.

Therefore, as shown in FIG. 3, when the electrostatic coating machine 6 is moved over the entire length of the front surface part 3A while maintain a fixed separation distance to the bumper 3 arranged at the coating position, the voltage drop level changes at positions where the flat surface F transitions to the left/right corner surface C. The high voltage control device 8 then saves the voltage drop characteristic curve a for when the bumper 3 is arranged at the normal position (the position shown in FIG. 3) which constitutes the correct coating position.

In this way, as shown in FIG. 4, when the bumper 3 is displaced from the normal position, i.e., is arranged at a positionally deviated position, because the position where the voltage drop level changes differs from the saved voltage drop characteristic curve a for the normal position, positional deviation of the bumper 3 can be detected by comparing the voltage drop characteristic curves a and b.

Next, when there is poor connection of the bumper 3, defects in forming of the conductive film on the flat surface F, etc., as shown in FIG. 5, since the voltage drop characteristic curve c will stay at a level close to zero, poor grounding of the bumper 3 can be detected on that basis.

While inspection for positional deviation and poor grounding of the bumper 3 by means of the abnormality detection unit 9 has been discussed, the abnormality detection unit 9 can detect positional deviation and poor grounding of the body 2 by saving the voltage drop change for the front panel 2A, engine hood 2B, left front fender 2C, right front fender 2D, left front pillar 2E, right front pillar 2F, roof 2G, left front door 2H, right front door 2J, left center pillar 2K, right center pillar 2L, left rear door 2M, right rear door 2N, left rear pillar, right rear pillar, trunk lid, left rear fender, right rear fender, rear panel, etc. of the body 2 arranged at the normal position and comparing it to the voltage drop change of the respective parts of the body 2 arranged at the coating position.

Here, as shown in FIG. 6, the high voltage control device 8 can make the difference in voltage drop levels on the flat surface F, corner surface C, hole-bearing surface S, and grounding failure surface Z clearer (greater) by reducing the separation distance between the bumper 3 and the electrostatic coating machine 6. Therefore, when detecting positional deviation or poor grounding of the bumper 3, it is desirable to bring the electrostatic coating machine 6 as close as 100 mm to the bumper 3.

However, when the electrostatic coating machine 6 is brought closer to the bumper 3, the impedance to ground may become smaller than expected, and there is a risk of inducing an electron avalanche or spark where the current flows all at once.

However, in the present embodiment, an abnormality detection unit 9 is provided, which detects abnormalities of the bumper 3 based on the difference between the level of high voltage (characteristic curve a) outputted from the high voltage generator 6B, and the voltage level (characteristic curves b, c) obtained when the electrostatic coating machine 6, which is not spraying coating material, is placed at a measurement position separated by a predetermined separation distance from multiple measurement points (flat surface F, left/right corner surface C) of the bumper 3 arranged at the coating position, and lines of electric force are formed to the bumper 3 with a constant current level. Specifically, the abnormality detection unit 9 can detect the positional deviation of the bumper 3 based on change in voltage level due to change in the separation distance between the bumper 3 and the electrostatic coating machine 6. In addition, the abnormality detection unit 9 can detect poor grounding of the bumper 3.

Therefore, since the abnormality detection unit 9 maintains a constant current level, an electron avalanche or spark is not induced even if the electrostatic coating machine 6 is brought too close to the bumper 3. Accordingly, the abnormality detection unit 9 can make the difference in voltage drop level on the flat surface F, corner surface C, hole-bearing surface S, and grounding failure surface Z clearer (larger) by bringing the electrostatic coating machine 6 closer to the bumper 3.

As a result, positional deviation of the bumper 3 relative to the conveyor 4 can be detected more easily, and the state of grounding of the bumper 3 can be detected, thus making it possible to maintain the coating gap between the bumper 3 and the electrostatic coating machine 6 at an optimal level, prevent poor grounding, and improve coating quality.

Next, FIG. 7 illustrates a second embodiment of the present invention. The distinguishing feature of the second embodiment is that positional deviation of the bumper is detected using the hole-bearing surface of the bumper. It should be noted that, for the second embodiment, the same reference symbols will be assigned to the same components as those described in the first embodiment above, and description thereof will be omitted.

In FIG. 7, the bumper 11, as the object to be coated according to the second embodiment, has a hole 11B in the front surface part 11A. Therefore, the bumper 11 is defined as having a flat surface F, which is the portion of the front surface part 11A away from the edge, and a hole-bearing surface S, which has the hole 11B.

Since the voltage drop level changes at the position where the flat surface F transitions into the hole-bearing surface S, the positional deviation of the bumper 11 can be detected by comparing its voltage drop characteristic curve (not illustrated) to the voltage drop characteristic curve d that was detected with the bumper 11 arranged at the normal position. Poor grounding of the bumper 11 can also be detected.

Thus, with the second embodiment configured in this manner, the same effect and function can be obtained as with the first embodiment described above.

It will be noted that the first embodiment illustrated a case where the body 2 and bumper 3 were supported at the coating position by the conveyor 4, and the second embodiment illustrated a case where the bumper 11 was supported at the coating position by the conveyor 4. However, the present invention is not limited to this, and for example, a configuration in which the object to be coated is transported by a robot or through manual operation and supported at the coating position by a support means may also be employed.

EXPLANATION OF REFERENCES

1 Electrostatic coating plant
2 Body (object to be coated)
3, 11 Bumper (object to be coated)
4 Conveyor (support means)
5 Grounding means
6 Electrostatic coating machine

6B High voltage generator
9 Abnormality detection unit

The invention claimed is:

1. An electrostatic coating plant comprising:

a support means for supporting an object to be coated at a coating position;

a grounding means connected to the object to be coated for grounding the object to be coated; and an electrostatic coating machine, wherein the electrostatic coating machine includes a voltage generator that outputs a voltage for forming lines of electric force to the object to be coated that has been grounded by the grounding means, wherein the electrostatic coating machine is configured for application to a coating material, and wherein the electrostatic coating machine is configured to coat the object to be coated, arranged at the coating position, by causing coating material, which has been electrostatically charged to a voltage, to fly along the lines of electric force, wherein the electrostatic coating plant comprises:

an abnormality detection unit configured to detect abnormalities of the object to be coated based on a difference between a measured voltage and a saved voltage, wherein the measured voltage is a level of the voltage outputted from the voltage generator, wherein the saved voltage is a voltage level obtained when the electrostatic coating machine, which is not spraying coating material, is placed at a measurement position opposite to and separated by a predetermined separation distance from one or multiple measurement points on the object to be coated, arranged at the coating position, wherein the abnormality detection unit is configured to detect whether the object to be coated is in a state suitable for electrostatic coating and is not in any abnormal state based on the difference between the measured voltage and the saved voltage, wherein the abnormal state indicates an unexpected-change in separation distance between the object to be coated and the electrostatic coating machine, and wherein an outflow current is maintained at a constant level between the abnormal state and the state suitable for electrostatic coating, despite changes in the measured voltage, to prevent the generation of sparks.

2. The electrostatic coating plant of claim 1, wherein the abnormal state includes positional deviation of the object to be coated.

3. The electrostatic coating plant of claim 2, wherein the abnormal state includes surface shape abnormality.

4. The electrostatic coating plant of claim 3, wherein the abnormal state includes poor grounding.

5. The electrostatic coating plant of claim 1, wherein the abnormal state includes surface shape abnormality.

6. The electrostatic coating plant of claim 5, wherein the abnormal state includes poor grounding.

7. The electrostatic coating plant of claim 1, wherein the saved voltage is from a saved voltage characteristic curve.

8. The electrostatic coating plant of claim of claim 7, wherein the saved voltage characteristic curve is generated by measuring the voltage from the voltage generator when the object is in a normal position.

9. The electrostatic coating plant of claim 1, where the abnormality detection unit does not use the outflow current to detect abnormalities.

* * * * *